(12) United States Patent
Pitbladdo

(10) Patent No.: US 7,150,165 B2
(45) Date of Patent: Dec. 19, 2006

(54) MOLTEN GLASS FINING APPARATUS

(76) Inventor: Richard Bruce Pitbladdo, 415 Augusta Blvd. #111, Naples, FL (US) 34113

( * ) Notice: Subject to any disclaimer, the term of this patent is extended or adjusted under 35 U.S.C. 154(b) by 0 days.

(21) Appl. No.: 10/745,082

(22) Filed: Dec. 23, 2003

(65) Prior Publication Data

US 2004/0134235 A1    Jul. 15, 2004

Related U.S. Application Data

(60) Provisional application No. 60/438,875, filed on Jan. 9, 2003.

(51) Int. Cl.
*C03B 5/16* (2006.01)
(52) U.S. Cl. .......................... 65/346; 65/347
(58) Field of Classification Search .................. 65/346, 65/347, 335, 134.2, 157
See application file for complete search history.

(56) References Cited

U.S. PATENT DOCUMENTS

| | | | | |
|---|---|---|---|---|
| 3,420,653 | A | * | 1/1969 | Boettner ...................... 65/335 |
| 4,029,489 | A | | 6/1977 | Froberg et al. ................ 65/136 |
| 4,906,272 | A | * | 3/1990 | Boettner ...................... 65/346 |
| 4,994,099 | A | | 2/1991 | Boettner ...................... 65/136 |
| 5,785,726 | A | | 7/1998 | Dorfeld et al. ............. 65/134.1 |
| 6,405,564 | B1 | * | 6/2002 | Takei et al. ................... 65/157 |
| 6,854,290 | B1 | * | 2/2005 | Hayes et al. ............... 65/134.2 |

* cited by examiner

*Primary Examiner*—Mark Halpern
(74) *Attorney, Agent, or Firm*—Brown & Michaels, PC

(57) ABSTRACT

The basic shape of the molten glass fining apparatus of the present invention is preferably either an elliptical or a somewhat rectangular shape such that the flow is more uniform and the bubbles have less distance to rise to the surface. A novel baffle design is also shown. The present invention improves the fining capability of the apparatus without increasing the cost of construction materials. In fact, the cost may be reduced.

55 Claims, 15 Drawing Sheets

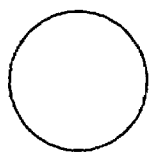
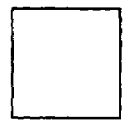
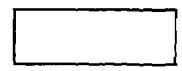
Figure 3A
PRIOR ART
Figure 3B
Figure 3C
Figure 3D
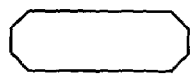
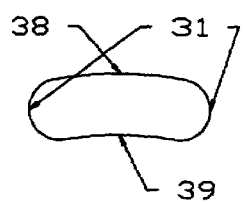
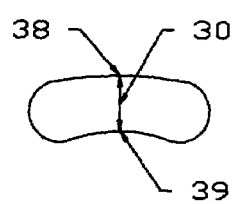
Figure 3E
Figure 3F
Figure 3G
Figure 3H Figure 5B
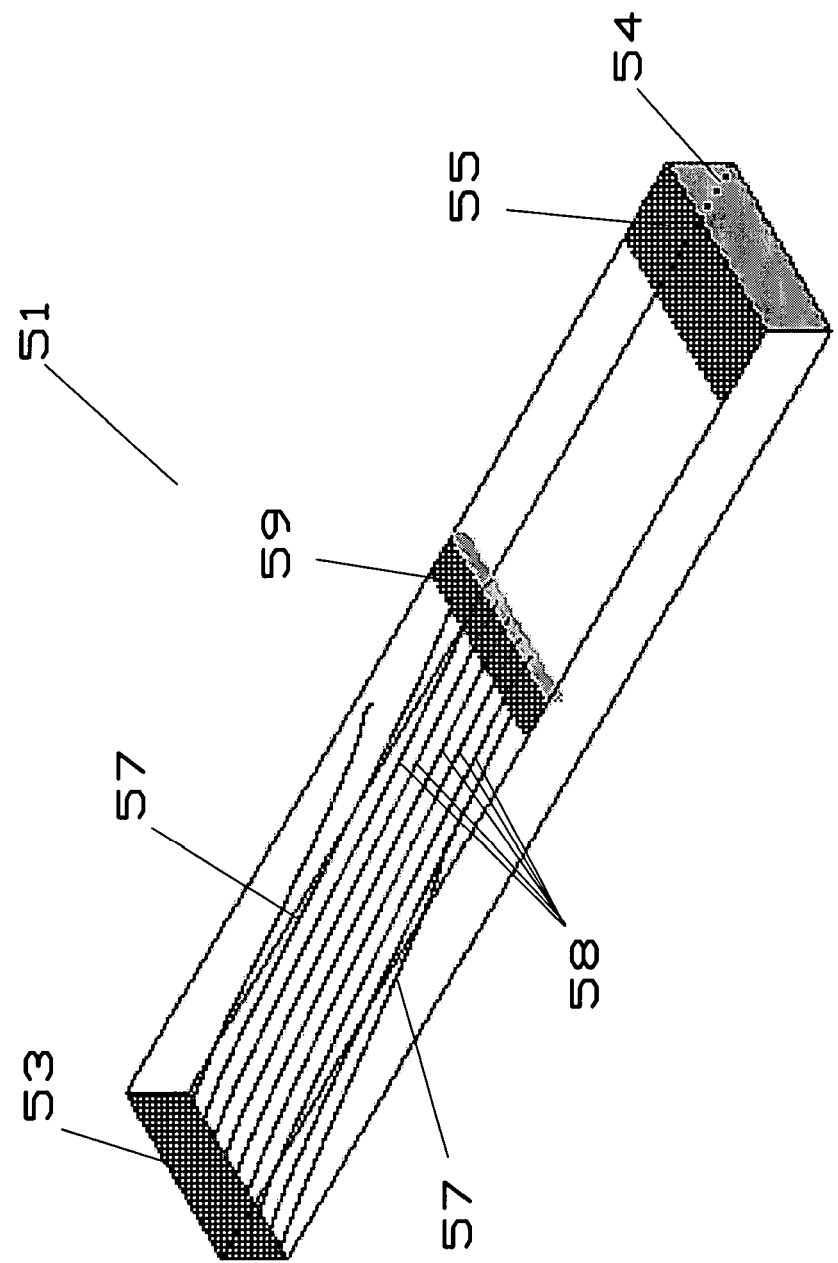
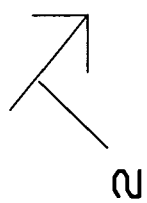

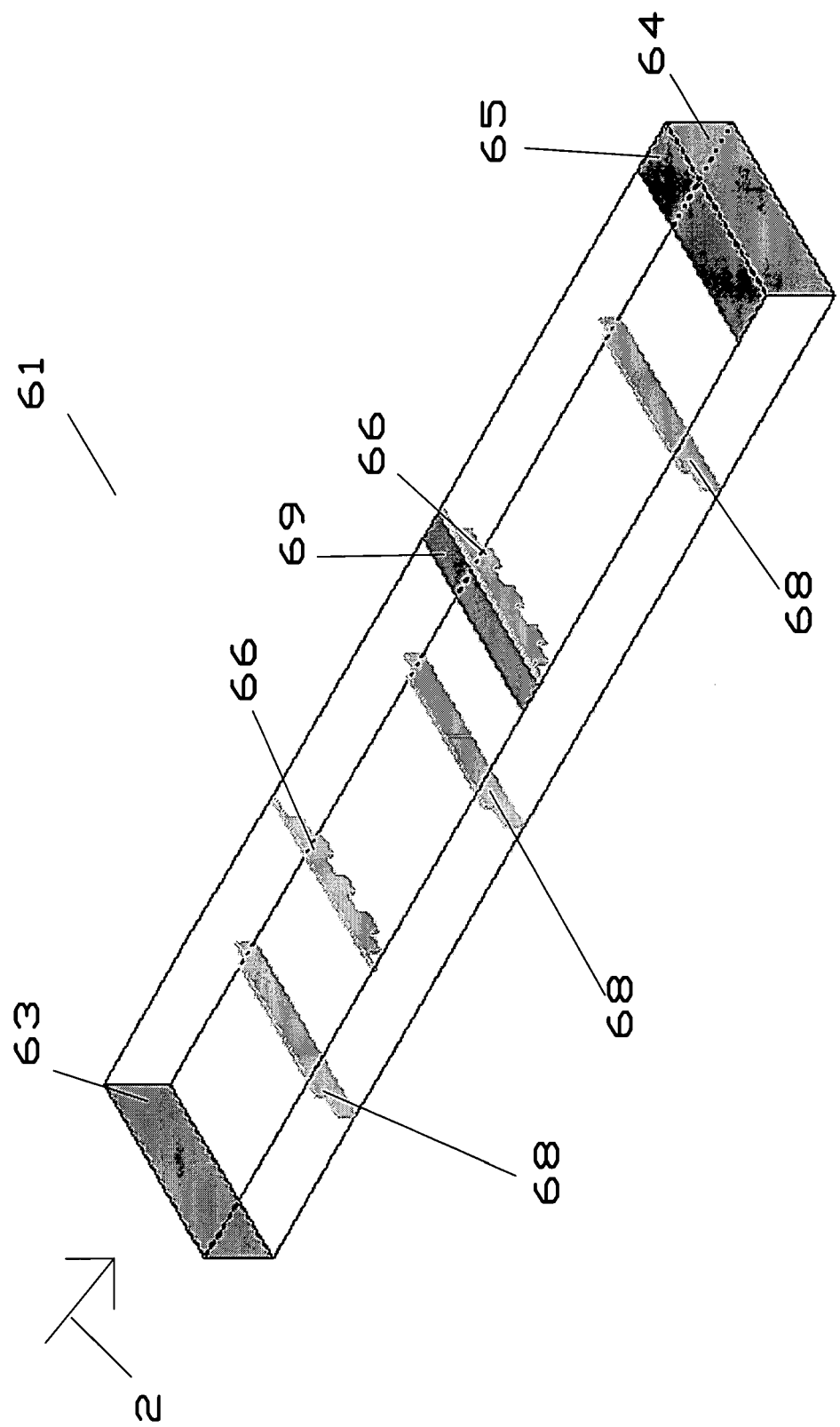

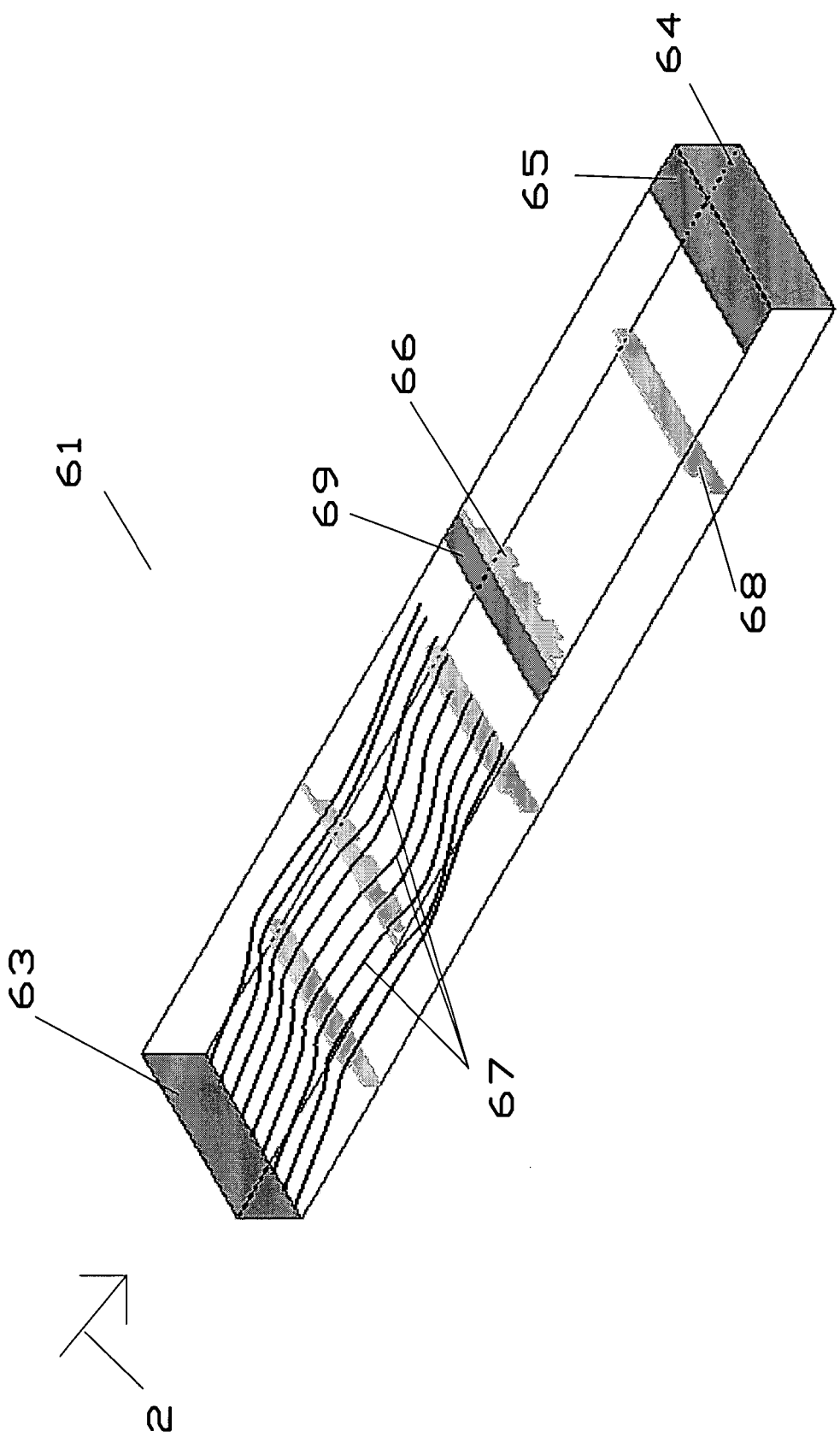

Figure 10A
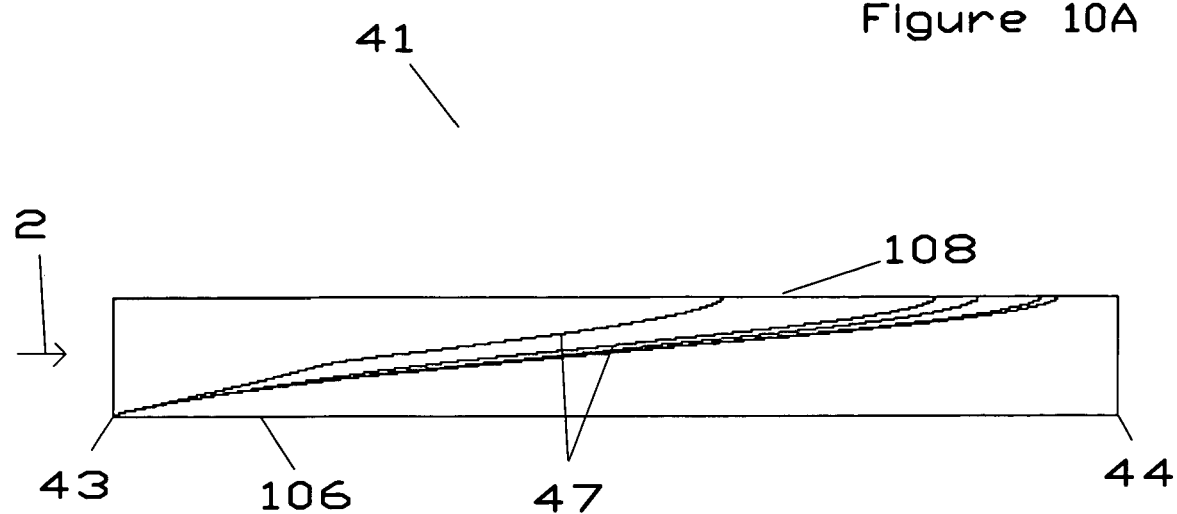
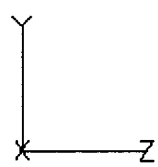
Figure 10B
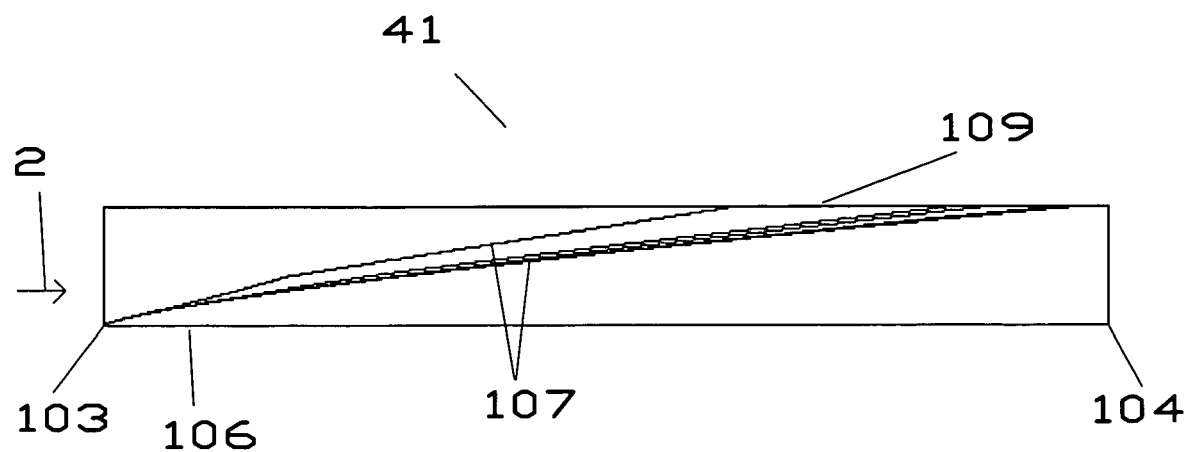
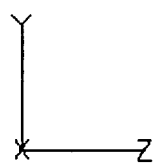

MOLTEN GLASS FINING APPARATUS

REFERENCE TO RELATED APPLICATIONS

This application claims an invention which was disclosed in Provisional Application No. 60/438,875, filed Jan. 9, 2003, entitled "MOLTEN GLASS FINING APPARATUS". The benefit under 35 USC §119(e) of the United States provisional application is hereby claimed, and the aforementioned application is hereby incorporated herein by reference.

BACKGROUND OF THE INVENTION

1. Field of the Invention

This invention relates generally to the manufacture of high quality glass and, more particularly, to optical quality glass used for optical lenses and glass sheet used for the production of TFT/LCD display devices that are widely used for computer displays.

2. Description of Related Art

Glass as melted from raw materials has many small bubbles of entrapped gases. These bubbles are considered defects in any glass product which requires optical properties. Bubbles of a size that can be seen by the eye or that interfere with the function of the product must be removed. The process for removing these bubbles is termed fining. Fining occurs after the glass is melted from raw materials, but before the glass is formed into a finished product. In optical quality glass this fining process is performed in a "finer" (or refiner), which is constructed of precious metal, typically platinum or a platinum alloy. The fining process is both chemical and physical. Chemicals are added to the glass such that the bubbles grow in size as they pass through the glass melting furnace and the finer. This invention is related to the physical aspect of fining, which is affected by the shape of the finer apparatus. The fining apparatus must be designed such that the removal of the bubbles from the molten glass is optimized. The finer is often very large, resulting in extremely high costs to fabricate the finer. In the fining process the bubbles rise to the top of the fining apparatus (finer) where they dissipate to the atmosphere. The size of the bubbles that are removed is a function of the size and design of the finer and the viscosity (fluidity) of the molten glass. In the glass industry these bubbles are called seeds if they are small (less than approximately 1 mm diameter) and blisters if they are large.

The prior art design which has been typically used since the start of this practice in the first half of the twentieth century is a cylindrical platinum tube with and without internal baffles. The primary innovations to date have been in the design of the baffles to alter the flow path for optimal bubble removal.

FIG. 1A shows a simplified version of a cylindrical finer (1) as known in the prior art. FIG. 2A shows a cylindrical finer with baffles. In FIG. 1A, the molten glass (2) enters finer (1) at the inlet end (3) and flows out the outlet (4). There is a free surface, or vent (5), at the outlet end (4), which is connected to the atmosphere, to allow the bubbles which accumulate at the top of the finer (1) to escape. FIG. 1B shows the typical path of bubbles (7) in a finer with a cylindrical cross-section (1), which enter the glass inlet (3) entrapped in the molten glass (2). Shown are bubbles which enter at the bottom of the finer inlet (3) and which must rise to the top of the finer at the outlet (4) so they may dissipate from the vent (5) to the atmosphere. With this cylindrically shaped finer (1) and with this size bubble the length of the finer is such that the bubbles just reach the top of the finer (1) where they are exposed to the vent (5) and can dissipate to the atmosphere.

In the baffled finer of FIG. 2A, the molten glass (2) enters the baffled finer (21) at the glass inlet end (23) and flows out the outlet (24). There is a vent (25) at the outlet end (24), which is connected to the atmosphere, to allow the bubbles which accumulate at the top of the baffled finer (21) to escape. Some of the baffles (26) have holes (22) which are sized to distribute the flow of the molten glass (2) such that the average residence time for the glass as it flows through the baffled finer (21) is more uniform. Other baffles (28) are designed to move the flow path vertically. There is often a vent (29) in front of a baffle as baffles also trap the surface bubbles into a foam-like accumulation which breaks down and dissipates into the atmosphere. FIG. 2B shows the movement of bubbles (27) through the baffled finer (21). The baffles (26) and (28) make the paths of the bubbles (27) in the baffled finer (21) quite torturous. This allows the smaller bubbles greater opportunity to coalesce together and form a larger bubble, which in turn will rise faster.

SUMMARY OF THE INVENTION

The present invention significantly modifies the currently known fining apparatus (finer). The basic shape is changed from a cylindrical shape to either an elliptical shape or a somewhat rectangular shape such that the flow is more uniform and the bubbles have less distance to rise to the surface. Baffles of a novel design are optionally included in an embodiment of the present invention to further increase fining performance. Prior art baffle designs are optionally included in an embodiment of the present invention to trap bubbles and serve as structural elements. The present invention improves the fining capability of the apparatus without increasing the cost of construction materials. In fact, the cost would be reduced for the same fining performance by shortening the length of the finer.

BRIEF DESCRIPTION OF THE DRAWINGS

FIG. 3A shows a cylindrical cross-section of a finer as known in the prior art.

FIG. 3B shows an elliptical cross-section of a finer in an embodiment of the present invention.

FIG. 3C shows a square cross-section of a finer.

FIG. 3D shows a rectangular cross-section of a finer in an embodiment of the present invention.

FIG. 3E shows a rectangular with chamfered sides cross-section of a finer in an embodiment of the present invention.

FIG. 3F shows a rectangular with curved sides cross-section of a finer in an embodiment of the present invention.

FIG. 3G shows a rectangular with curved sides and an arced top and bottom cross-section of a finer in an embodiment of the present invention.

FIG. 3H shows a cross-sectional shape similar to FIG. 4G, except the top and bottom surfaces are not parallel.

FIG. 5B shows the rising of bubbles in the finer of FIG. 5A.

FIG. 6A shows a rectangular cross-section finer with prior art baffles in an embodiment of the present invention.

FIG. 6B shows the rising of bubbles in the finer of FIG. 6A.

FIG. 10A shows a side view of the bubbles rising in the rectangular finer of FIG. 4B, where the glass contacts all the internal surfaces.

FIG. 10B shows a side view of the bubbles rising in the rectangular finer of FIG. 4B, where the glass does not contact the top surface.

DETAILED DESCRIPTION OF THE INVENTION

Figure 1A:
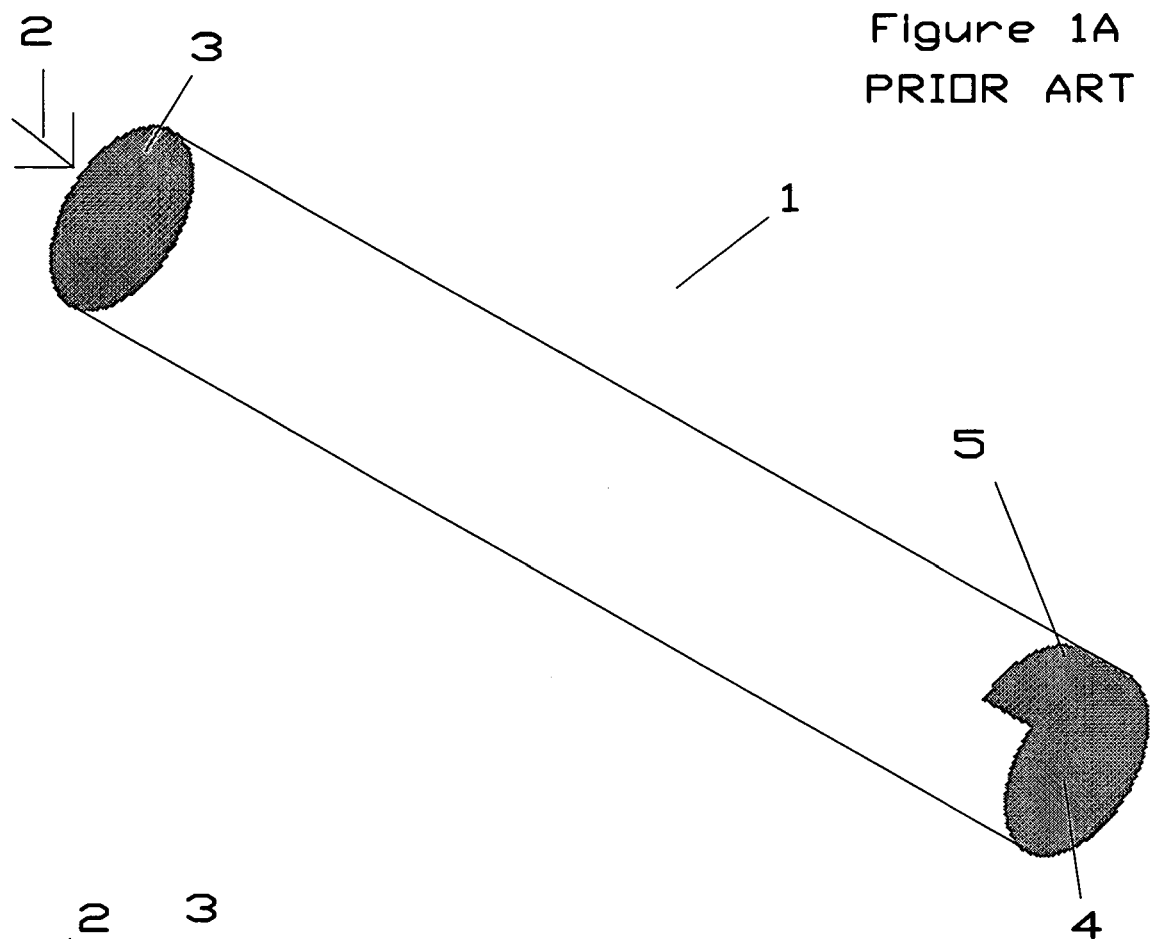
FIG. 1A shows a cylindrical finer as known in the prior art.

The present invention overcomes the shortcomings of the prior art in two ways. First, by increasing the ratio of cross-section area to height of the finer, the bubbles have less distance to rise relative to the time for the glass to pass through the finer. Second, by making the shape thin and wide the velocity distribution of the flow through the finer is more uniform. The "walls" of the finer define the cross-sectional shape. As defined in the application, the walls can either be a single continuous portion (i.e. a cylinder or an ellipse), or discrete portions (i.e. a square or a rectangle).

The ratio of the cross-sectional area for flow to the height of the apparatus is an important parameter in all the embodiments of the present invention. The designs of the present invention maximize this parameter. Simultaneously, if the perimeter of the apparatus is held constant, the cost of the platinum and other construction materials remain substantially the same. The velocity of flow of the glass is proportional to the volume flow of the glass divided by the cross-sectional area.

The ratio of finer cross-sectional area to finer height is indicative of the relative fining performance of a finer design. The larger the area for flow, the slower the molten glass moves through the finer, allowing more time for the bubbles to rise. The lower the height of the finer, the less distance the bubbles must rise. The ratio of the two dimensions creates a parameter termed "performance ratio" herein. The higher the performance ratio, the faster the finer removes bubbles. The performance ratio is a figure of merit, not an exact determinant of performance, especially when the shapes become more complex.

Bubbles rise in the liquid glass at a speed proportional to the square of the diameter of the bubble. The larger the bubble, the faster it rises. The flow dynamics in the embodiments of the present invention are designed to make the velocity profiles as uniform as possible, in all vertical planes, within the constraints of Newtonian Fluid Flow.

FIGS. 3A to 3H show various finer cross-sections. These shapes all have the same perimeter, therefore the cost of construction is substantially equal. Table 1 shows the height, width, cross-sectional area, width to height ratio (aspect ratio) and performance ratio for each cross-sectional shape.

TABLE 1

| Figure | Height | Width | Aspect Ratio | Area | Performance Ratio |
| --- | --- | --- | --- | --- | --- |
| 3A | 0.3183 | 0.3183 | 1.00 | 0.0796 | 1.00 |
| 3B | 0.1497 | 0.4489 | 3.00 | 0.0528 | 1.41 |
| 3C | 0.2500 | 0.2500 | 1.00 | 0.0625 | 1.00 |
| 3D | 0.1250 | 0.3750 | 3.00 | 0.0469 | 1.50 |
| 3E | 0.1367 | 0.4102 | 3.00 | 0.0529 | 1.55 |
| 3F | 0.1400 | 0.4200 | 3.00 | 0.0546 | 1.56 |
| 3G | 0.1396 | 0.4188 | 3.00 | 0.0545 | 1.56 |
| 3H | 0.1383 | 0.4148 | 3.00 | 0.0547 | 1.58 |

The perimeter of all of the shapes is the same, normalized to 1.00 unit of distance, thus the comparisons in Table 1 are between shapes with the same cost of raw materials. In order to simplify the comparisons between the performance ratios (cross-sectional area divided by height) of the various shapes, the performance ratio of the prior art cylindrical finer (FIG. 3A) has been adjusted to 1.00. This was done by multiplying the area divided by the height by a factor of four.

FIG. 3A shows the cylindrical cross-section as known in the prior art. The cylindrical finer has an aspect ratio of 1.00 and a performance ratio of 1.00. In contrast, the cross-sectional shape of the finer of the present invention preferably has a width to height ratio (aspect ratio) substantially greater than 1.00. The aspect ratio of the finer is preferably 1.50 or greater. In a preferred embodiment, the aspect ratio of the finer is approximately 3.00.

FIG. 3B shows an elliptical cross-section of a finer of the present invention, with an aspect ratio of 3.00. Its performance ratio is 1.41, which means that it removes bubbles more quickly than the cylindrical cross-section of FIG. 3A.

Figure 1B:
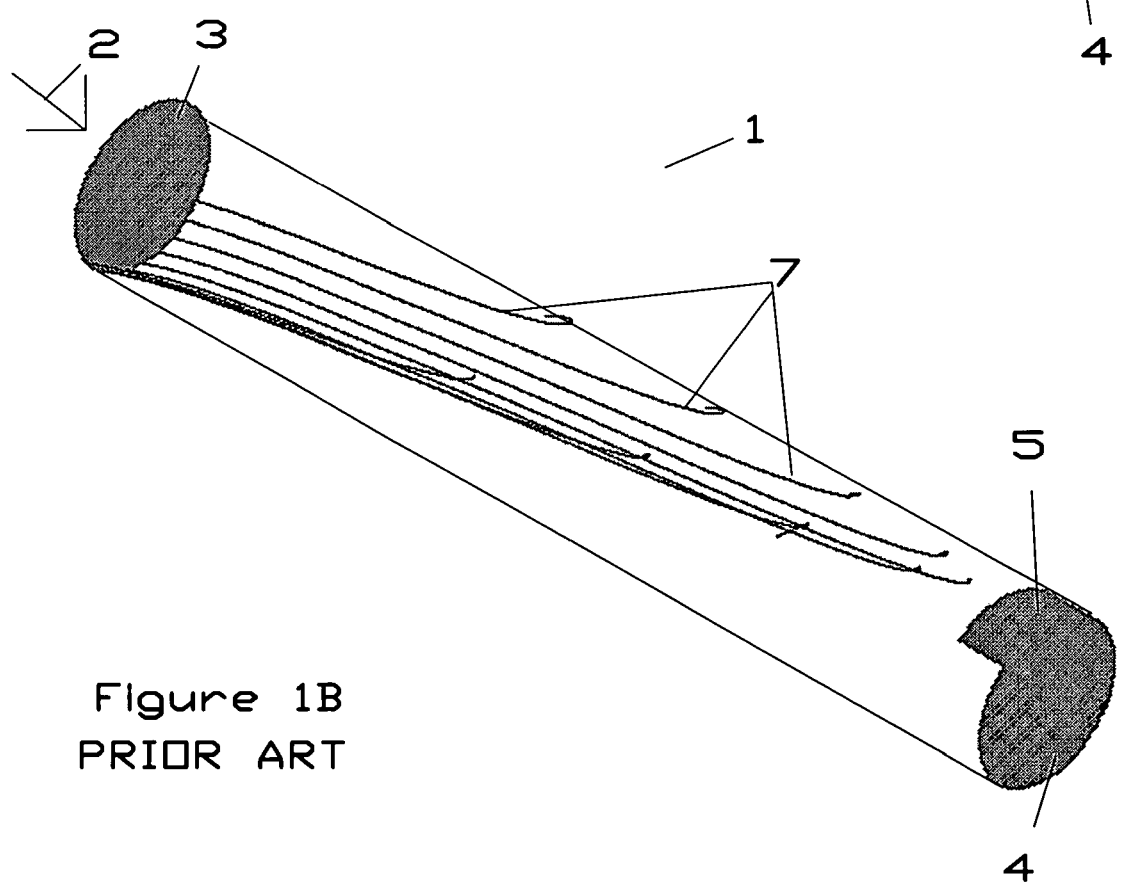
FIG. 1B shows the rising of bubbles in a finer of FIG. 1A.

FIG. 3C shows a square cross-section of a finer, the performance of which is compared to that of the cylindrical cross-section finer in FIGS. 1A and 1B. Since its performance ratio is 1.00, it removes bubbles with approximately the same efficiency as the finer with the cylindrical cross-section in FIG. 3A.

FIG. 3D shows a rectangular cross-section of a finer of the present invention. This finer has an aspect ratio of 3.00 and a performance ratio of 1.50. This finer removes bubbles substantially more quickly than the finer with the cylindrical cross-section, shown in FIG. 3A, or the finer with the square cross-section, shown in FIG. 3C.

FIGS. 3E, 3F, 3G and 3H are various embodiments of a finer with a substantially rectangular cross-section. All of these embodiments have an aspect ratio of 3.00. The finer in FIG. 3E has a rectangular cross-section with sides, or corners, which are preferably chamfered or curved. FIG. 3F shows a rectangular cross-section with rounded or curved sides. FIG. 3G shows a rectangular cross-section with rounded or curved sides and an arced top and bottom. This design increases structural rigidity. FIG. 3H is similar to the shape of FIG. 3G, except that its top (38) and bottom (39) surfaces are not parallel. The flow velocity at the center of the parallel top (38) and bottom (39) surfaces in FIG. 3G is slightly faster than at the sides (31). The cross-section in FIG. 3H has a bottom surface (39), which is arced more than the top surface (38), making the vertical distance (30) at the center slightly less. This altered cross-section both slows the relative velocity of the glass at the center and decreases the distance that bubbles must rise. This equalizes the fining performance over a greater percentage of the width of the finer.

Figure 2A:
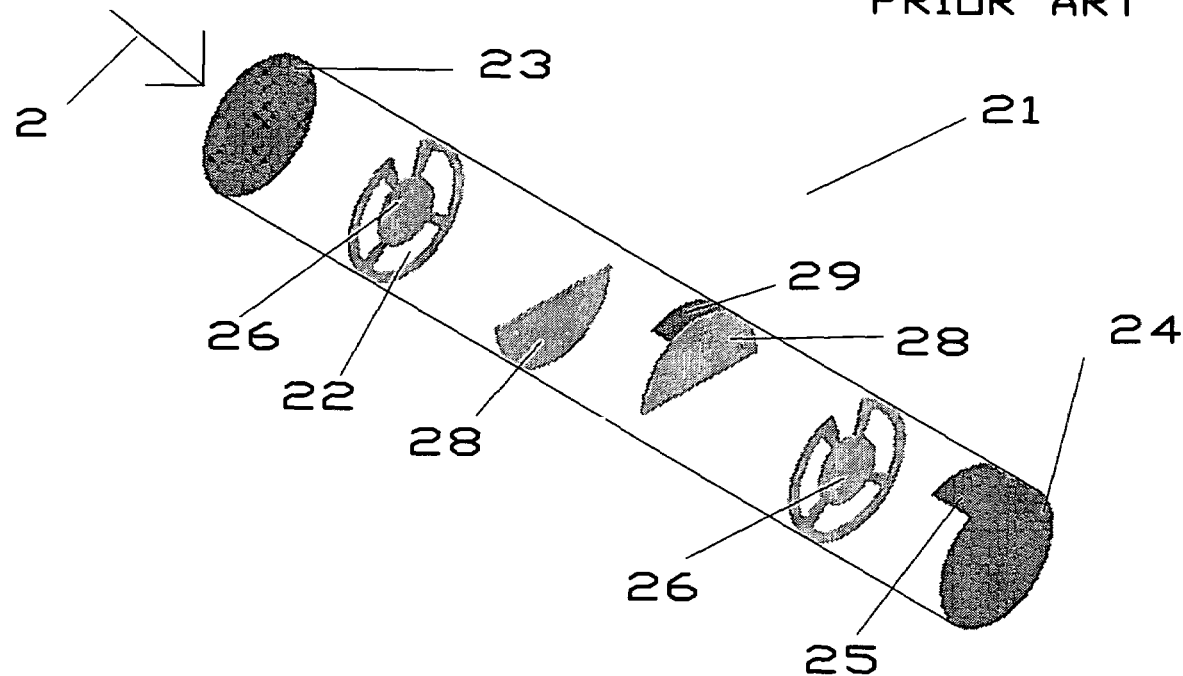
FIG. 2A shows a cylindrical finer with baffles as known in the prior art.
Figure 2B:
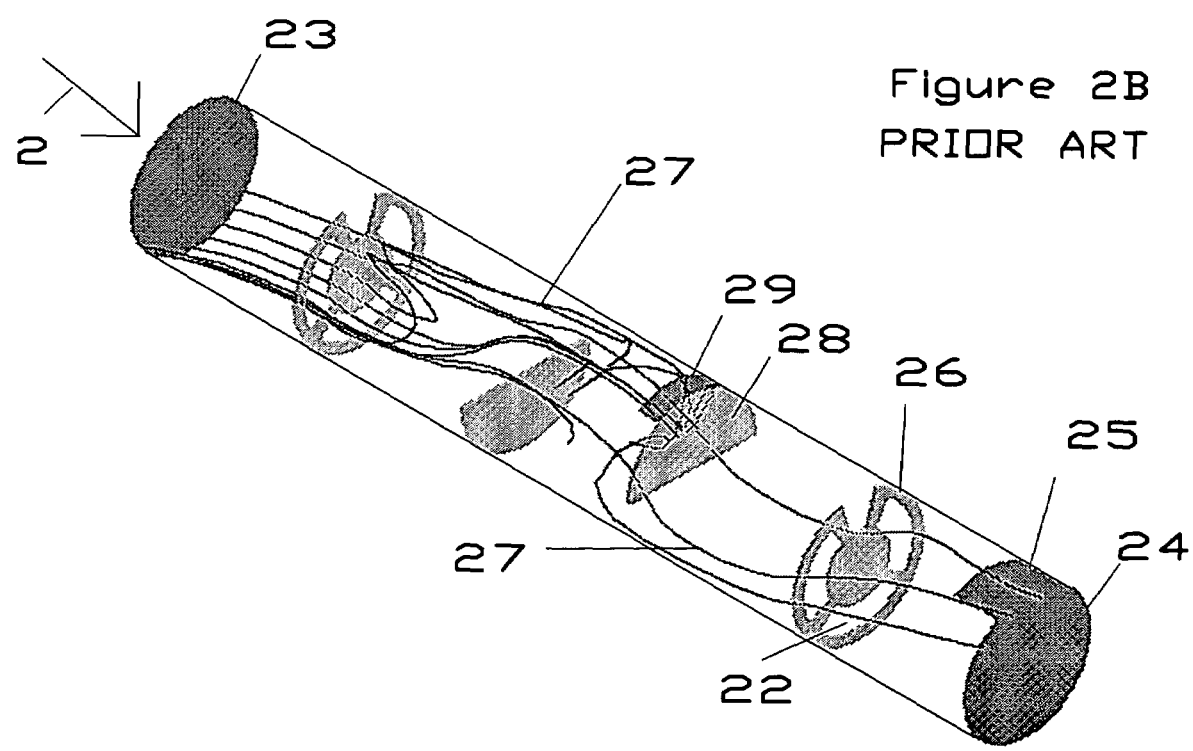
FIG. 2B shows the rising of bubbles in the finer of FIG. 2A.

The bubble trajectories shown in FIGS. 1B and 2B and subsequent Figures in this application were calculated using a technology termed "computational fluid dynamics" which uses computers to predict the motion of gases and liquids. The particular product used for the calculations herein was CFD2000®, which is one of several products that are commercially available. In FIGS. 1B, 2B, 4B, 5B, 6B, 10A and 10B, where trajectories are shown, the perimeter and length of each finer discussed are all equal in order to provide consistency in the interpretation of the finer performance.

Figure 4A:
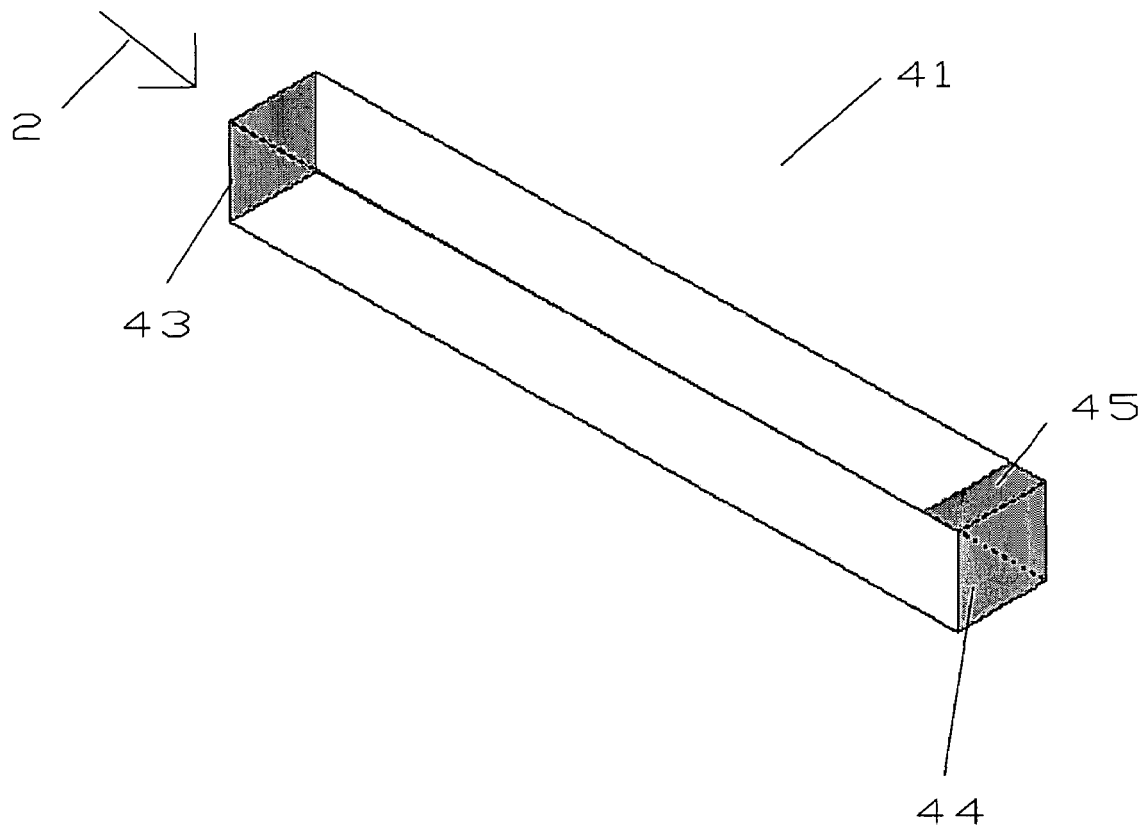
FIG. 4A shows a square cross section finer.

FIG. 4A shows a finer (41) with a square cross-section, which has the same perimeter as the finer with the cylindrical cross-section (1) in FIG. 1A and is the same length as the finer with the cylindrical cross-section (1) in FIG. 1A.

Figure 4B:
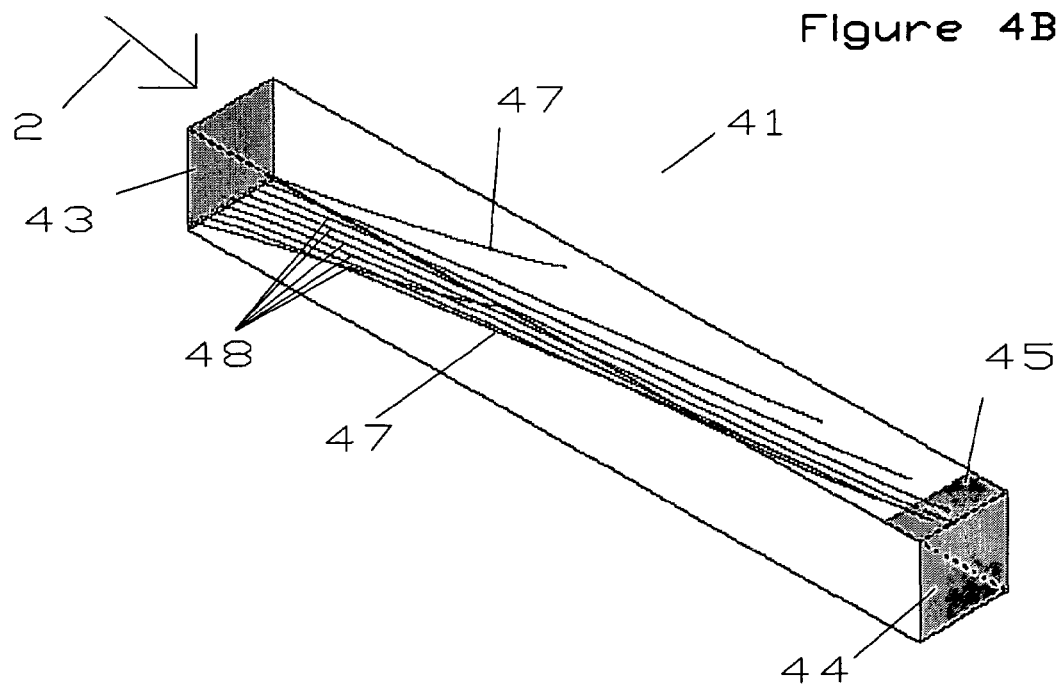
FIG. 4B shows the rising of bubbles in the finer of FIG. 4A.

FIG. 4B shows the paths of the bubbles (47) rising in the finer shown in FIG. 4A. Shown are the paths of bubbles entrapped in the molten glass (2), which enters at the bottom of the inlet (43). The bubbles rise to the vent (45) at the outlet (44) in approximately the same distance as in the finer with the cylindrical cross-section (1). This verifies that the performance ratio analogy is valid for cross-sections as widely different as circular and square cross-sections.

Figure 5A:
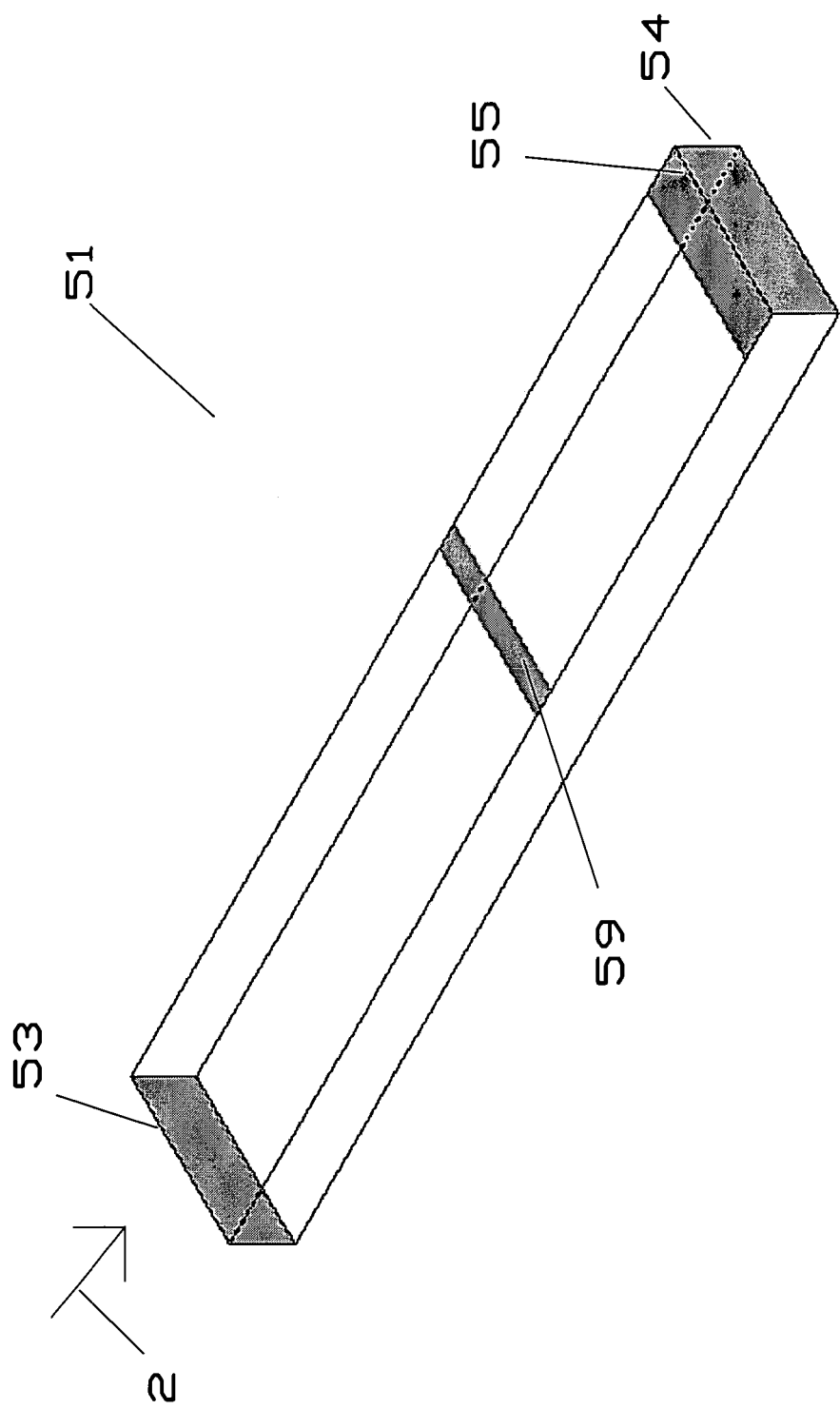
FIG. 5A shows a finer with a rectangular cross-section and an aspect ratio of 3.00 in an embodiment of the present invention.

FIG. 5A shows a finer (51) with a rectangular cross-section that has an aspect ratio of 3.00 and which has the same perimeter as and is the same length as the finer with the cylindrical cross-section (1) in FIG. 1A and the square cross-section (41) in FIG. 4A.

FIG. 5B shows the paths of the bubbles (57) rising in the finer shown in FIG. 5A. Shown are the paths of bubbles entrapped in the molten glass (2) which enters at the bottom of the inlet (53). In order to rise to the top of the finer (51), the bubbles (57) travel a much shorter distance than in either the finer with the cylindrical cross-section (1), shown in FIG. 1B, or the finer with the square cross-section (41), shown in FIG. 4B. The bubbles then proceed along the top of the finer until they reach a first vent (59) along the top of the finer or a second vent (55) at the outlet (54) where they dissipate to the atmosphere. The first vent (59) allows bubbles that have risen to the top of the finer (51) prior to reaching the vent (59) to dissipate to atmosphere. Other bubbles, which may not yet have risen to the top of the finer at vent (59), continue to travel through the finer, and dissipate to the atmosphere through vent (55).

The first vent (59) is optional, and the invention also contemplates a single vent (55) at the outlet end of the finer without deviating from the spirit of the invention. Since the rate the bubbles rise is proportional to the square of the diameter, the larger bubbles will dissipate faster in a shorter finer permitted by the present invention. With two vents, the larger bubbles are released to atmosphere earlier through the first vent (59). Then, the smaller bubbles dissipate to atmosphere through vent (55). This allows for smaller bubbles to be removed from the glass than in the prior art finers. In this embodiment, a shorter finer can be constructed with the same fining performance as the prior art, thus saving substantial construction cost.

Another novel property of the wide (high aspect ratio) finer is that the flow velocity is more uniform over the width of the finer. This is illustrated by comparison of the paths of the bubbles (47) in the finer with the square cross-section (41), shown in FIG. 4B, with the paths of the bubbles (57) in the finer with the rectangular cross-section (51), shown in FIG. 5B. There are nine paths shown in each finer configuration. The center five paths (58) in the finer with the rectangular cross-section (51) are substantially the same length, whereas, except for symmetry, the center five path lengths (48) in the finer with the square cross-section (41) are different. The same comparison can be made with the cylindrical cross-section finer (1) of FIG. 1B. Except for symmetry, the path lengths of the bubbles (7) in the cylindrical finer (1) are all different. This increases the fining efficiency even more than the performance ratio indicates.

FIG. 6A shows a finer (61) with a rectangular cross-section, similar to the finer (51) shown in FIG. 5A, incorporating prior art type baffles. As discussed above, the molten glass (2) enters the finer (61) at the inlet end (63). A vent (65) is located at the outlet end (64) of the finer (61). Baffles (66) and (68) of different shapes are added to further redistribute the flow and to trap bubbles that have risen to the free surface at a vent (69) in front of one of the baffles (66). In addition, the baffles (66) and (68) act as structural elements in the finer (61). FIG. 6B shows the trajectories of the bubbles (67) in the finer (61) of FIG. 6A. Note that the trajectories of the bubbles (67) are of substantially the same length.

Figure 7A:
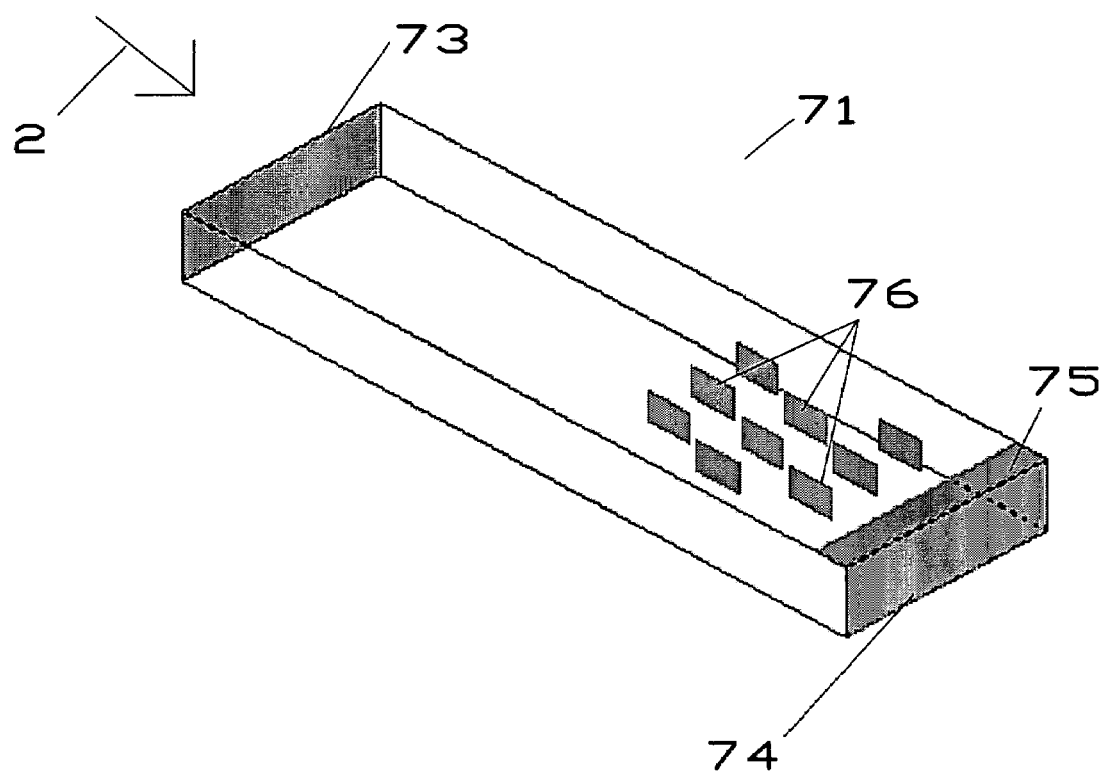
FIG. 7A shows a shortened rectangular cross-section finer with novel fin type baffles in an embodiment of the present invention.

FIG. 7A shows a finer with a rectangular cross-section (71), which has been made shorter to save the cost of construction materials and to achieve the same performance as the cylindrical finer in FIG. 1A. This finer incorporates a novel fin type baffle (76) design, whereby the baffles (76) are aligned with the direction of glass flow. Prior art baffles are mounted perpendicular to the direction of glass flow and have significant volumes of dead flow on the front and back sides. The novel baffle (76) design slows the glass flow via viscous drag which is the same phenomenon as the viscous drag caused by the walls of the finer. This baffle design could be incorporated into any of the cross-sectional shapes for the finer of the present invention.

The baffles (76) shown are in the form of fins and are mounted at the top of the finer near the outlet (74) of the finer. The fins are preferably aligned at an acute angle to the direction of glass flow. The glass at the top of the outlet (74) of the finer has a multitude of bubbles not yet removed. The baffles (76) slow the flow at this location due to viscous drag such that the bubbles have more time to rise and dissipate, whereas the glass flowing beneath the baffles (76) at the bottom of the finer at this location near the outlet (74) is sufficiently fined and is allowed to flow rapidly out the exit. The vent (75) allows the bubbles (77) to escape to atmosphere.

Figure 7B:
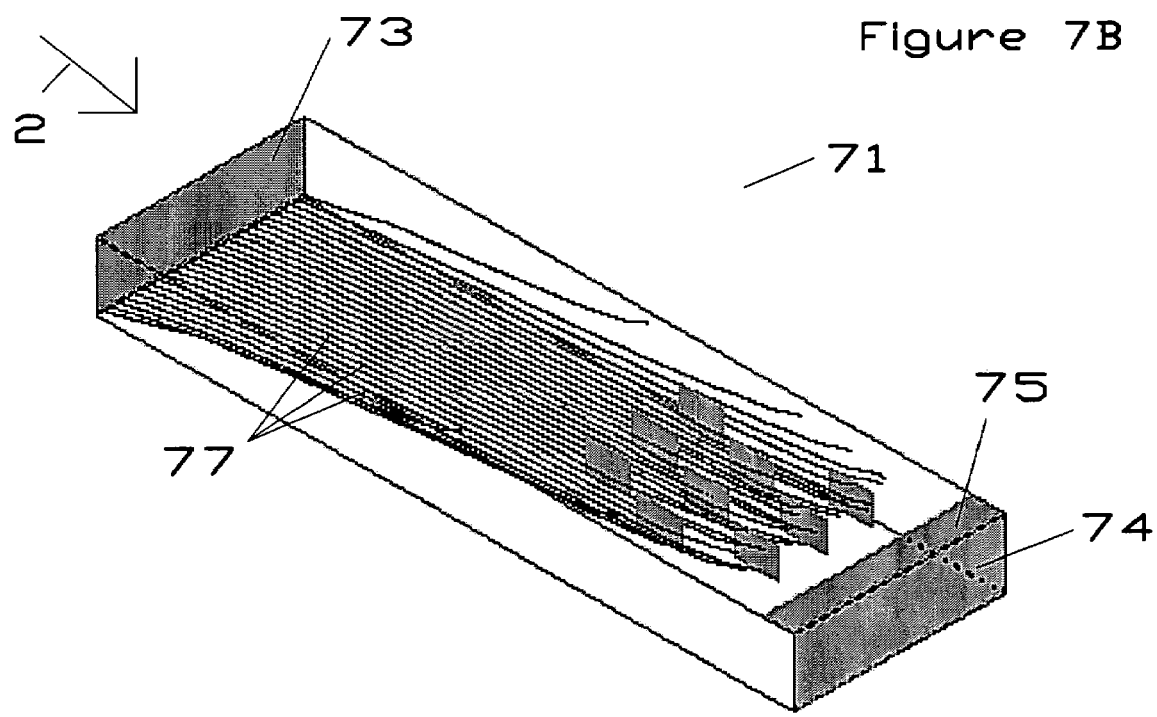
FIG. 7B shows the rising of bubbles in the finer of FIG. 7A.

FIG. 7B shows the trajectories of bubbles (77) in the baffled finer (71) of FIG. 7A. The trajectories of twenty seven bubbles have been shown, as the paths between the baffles are quite complex.

The bottom of the finer near the inlet (73) is another location for baffles (76) of this design. Baffles (76) of this design may be used at other locations in the finer where redistribution of flow is desirable.

The fin baffles shown have a plane surface and are directly aligned to the glass stream. In alternative embodiments, the fins have a curved surface and/or are set at an angle to the glass steam. These fins would resemble the stator section of a gas turbine.

Figure 8A:
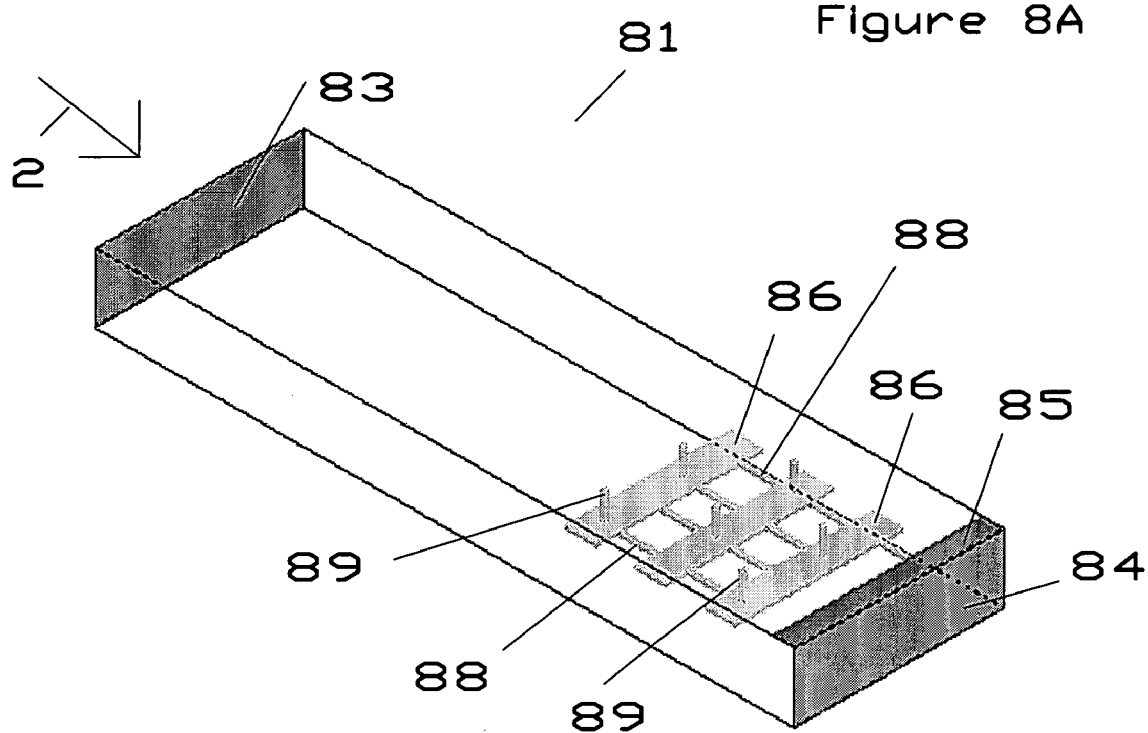
FIG. 8A shows a shortened rectangular cross-section finer with novel plate and post type baffles in an embodiment of the present invention.

FIG. 8A shows a finer with a rectangular cross-section (81), which incorporates another baffle (86) design. This design includes plates (86), similar to the fins, but which are mounted in the central portion of the glass stream by posts (89) and connected by struts (88). Unlike the fins (76), which are connected to at least one wall, the plates (86) are mounted away from the walls. The glass enters the finer (81) at the inlet end (83). As shown, the plates (86) are mounted horizontally which is substantially parallel to the top and bottom surfaces of the finer such that streamlines of flow are altered primarily by the viscous drag of the surface of the plates. A surface of each plate (86) is preferably substantially parallel to a set of streamlines of flow through the finer.

Figure 8B:
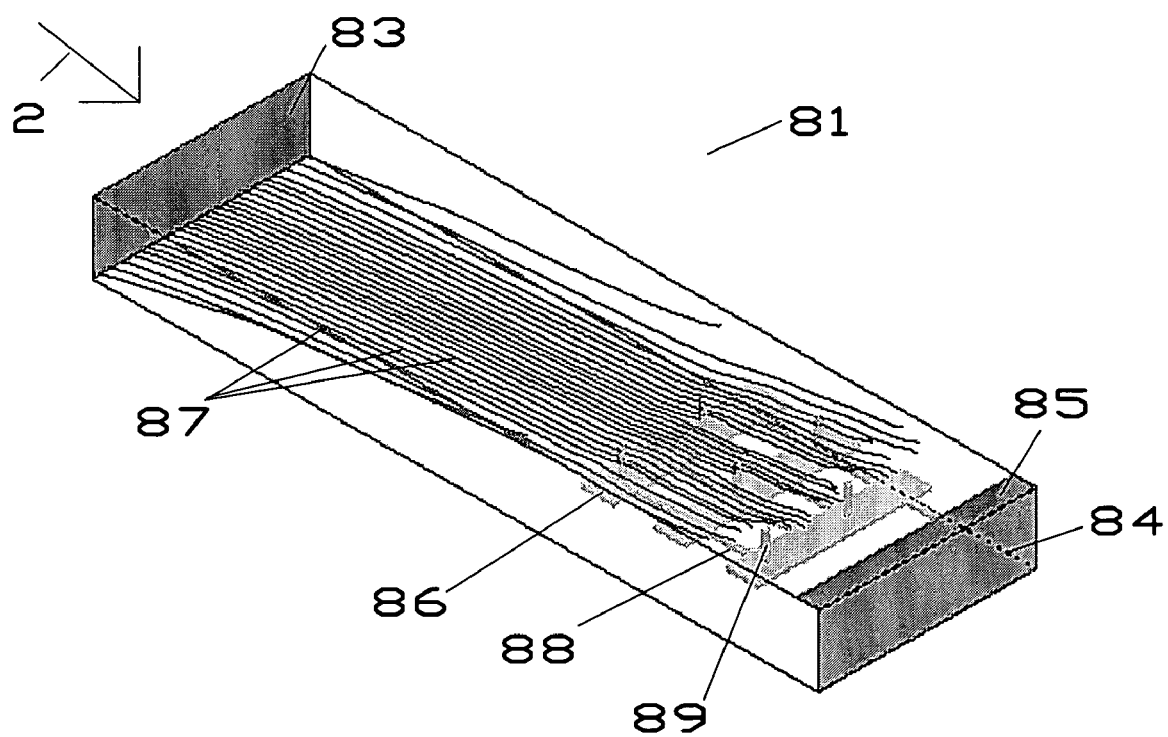
FIG. 8B shows the rising of bubbles in the finer of FIG. 8A.

FIG. 8B shows the trajectories of bubbles (87) in the baffled finer (81) of FIG. 8A. The trajectories of twenty seven bubbles have been shown. The vent (85) allows the bubbles (87) to escape to atmosphere at the outlet end (84).

Figure 8C:
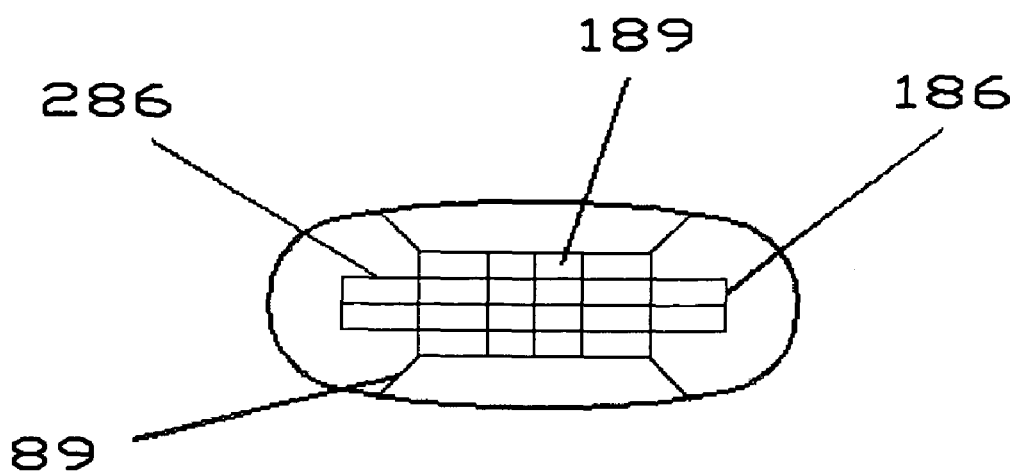
FIG. 8C shows a plurality of vertical plates connecting a plurality of horizontal plates to produce a structure through which the passages for flow are rectangular in cross-section in an alternative embodiment of the present invention.
Figure 8D:
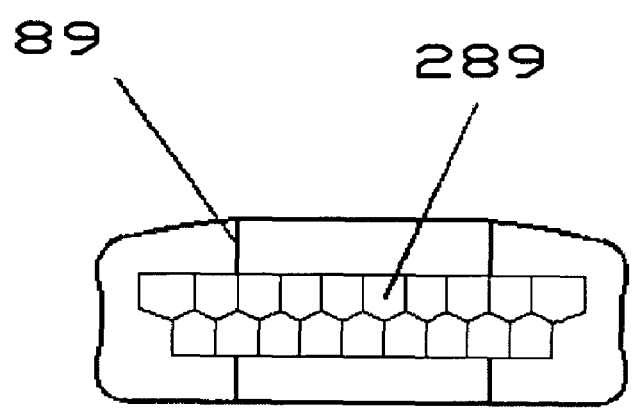
FIG. 8D shows a plurality of angled plates, such that the passages through the structure are pentagonal in cross-section in an alternative embodiment of the present invention.
Figure 8E:
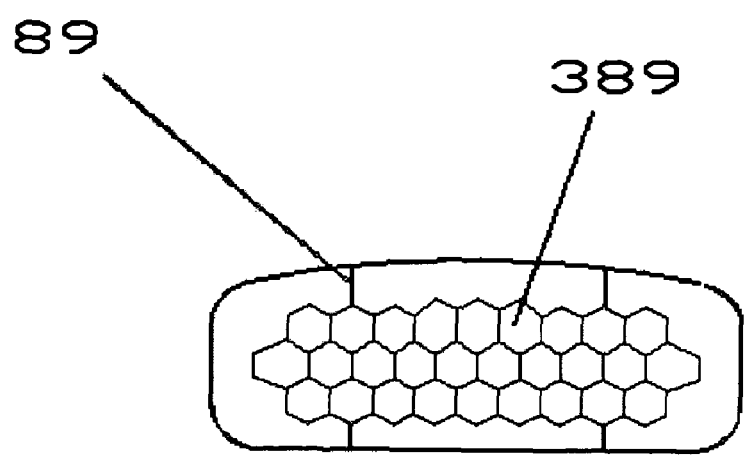
FIG. 8E shows a plurality of angled plates, such that the passages through the structure are hexagonal in cross-section in an alternative embodiment of the present invention.

The plates may also be mounted vertically. A plurality of vertical plates (186) may be used to connect a plurality of horizontal plates (286) to produce an egg-crate type structure through which the passages (189) for flow are rectangular in cross-section, as shown in FIG. 8C. The plates need not all be in either horizontal or vertical planes, but may alternately be angled relative to each other such that the passages through the structure are either pentagonal (289) or hexagonal (389) in cross-section, as shown in FIGS. 8D and 8E respectively. A hexagonal cross-section efficiently uses platinum.

In alternative embodiments, the plates have a curved surface and/or are set at an angle to the glass steam, such that the velocity of the glass flow is also altered by said shape of and angle of the plates.

Figure 9:
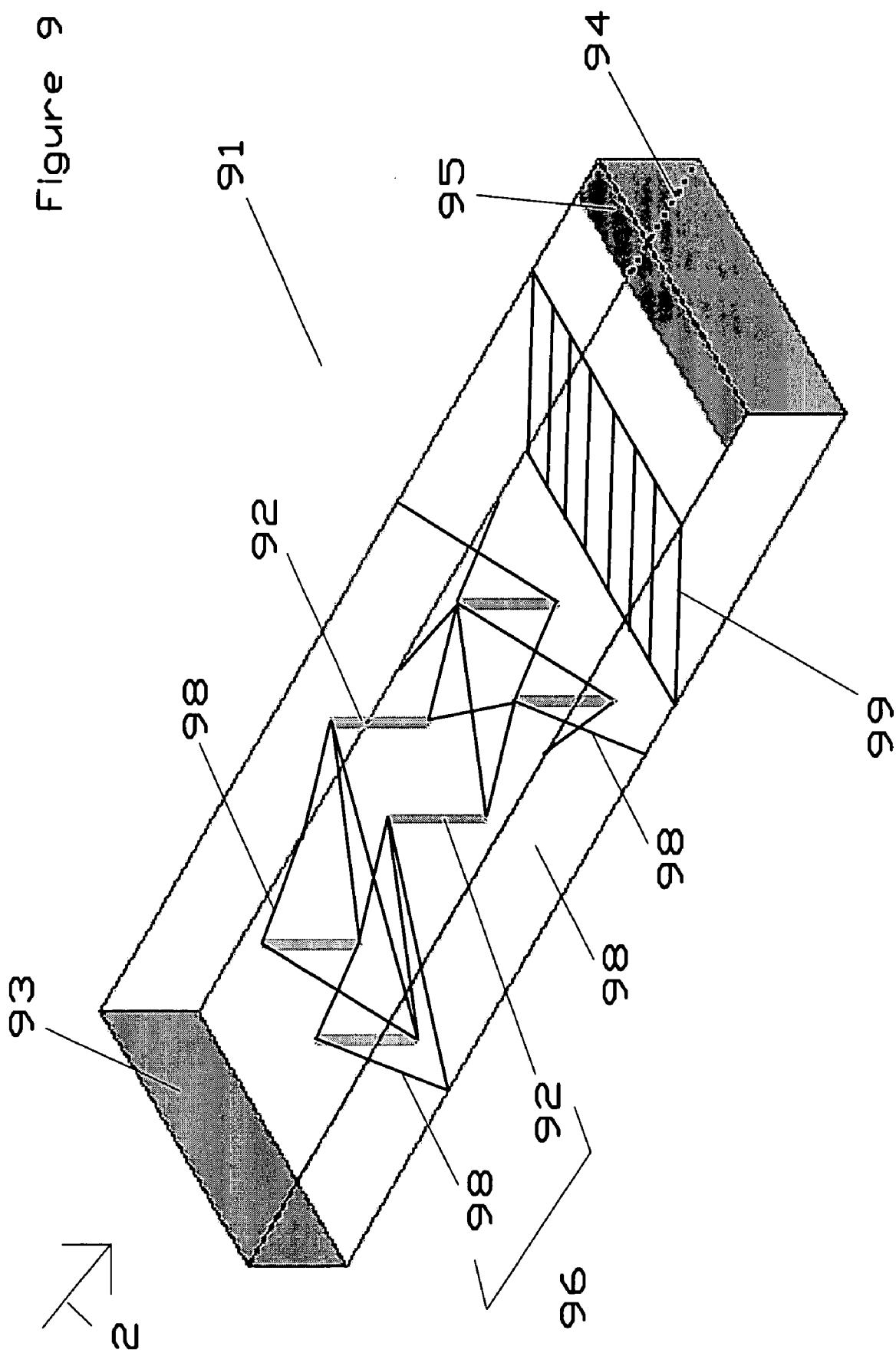
FIG. 9 shows a rectangular cross-section finer with novel rod type baffles in an embodiment of the present invention.

FIG. 9 shows another embodiment of the present invention. The glass enters the finer (91) at the inlet end (93). The vent (95) allows the bubbles to escape to atmosphere at the outlet end (94). The finer (91) in this embodiment includes a first matrix (96) of many thin rods (92) and (98) placed in the glass stream such that any bubble passing through the finer would pass in close proximity to a rod. The matrix (96) includes both vertical rods (92) and rods (98) angled upward in the direction of glass flow such that viscous forces assist the rise of the bubbles. The matrix (96) is much like a random maze of rods.

A second matrix of rods (99) includes multiple rods (99) preferably slanted in an upward direction such that viscous forces of the glass passing the rods drag the bubbles toward a top of the finer. A bubble attaches itself to a rod (92), (98) or (99) and to other bubbles on the rod. Although there are only a few rods shown in FIG. 9, this embodiment preferably includes a large number of rods. The bubbles coalesce to form a larger bubble, become more buoyant, and eventually rise to the finer top surface. The rods (92), (98) and (99) are preferably either round or rectangular in cross-section and large enough in size to survive the viscous drag forces. The entrapment of bubbles by this embodiment is similar to that of a furnace filter.

In all of the embodiments discussed thus far, the glass completely filled the finer, thus there was glass in contact with all the internal surfaces. In the prior art the glass often does not completely fill the finer, thus there is a free surface on the top surface of the glass flowing though the finer. This alters the flow distribution of the glass, as the top surface has no viscous drag to slow its velocity. The resultant fining performance of the finer, however, is not greatly influenced because, even though the top surface glass moves faster, the glass close to the walls moves slower. This is best modeled in a square cross-section finer.

FIG. 10A shows a side view of the trajectory of bubbles (47) rising in the rectangular finer (41) in FIG. 4B, in which the glass contacts all internal surfaces. The bubbles rise at substantially the same speed so they move vertically faster when the glass is flowing slower near the bottom wall (106) next to the inlet (43) and near the top wall (108) next to the outlet (44).

FIG. 10B shows a side view of the bubbles rising in the rectangular finer in an alternative embodiment of the present invention, in which the glass has a free top surface (109). The bubbles move vertically faster when the glass is flowing slower near the bottom wall (106) at the inlet end (43) and move vertically slower as the bubbles enter the faster flowing glass near the free surface (109). This can be seen when comparing the two bubble trajectories (47) and (107). Although the paths are different, the end result (the horizontal distance for the bubbles to rise vertically) is essentially the same.

A high aspect ratio finer in which the top surface of the glass is a free surface does not require the top surface of the finer to be made of a precious metal (platinum). The top surface could be made from a high performance refractory or if required, a refractory to which a thin layer of platinum is attached, i.e. flame sprayed. This would allow the finer to have a greater cross-sectional area for flow, as only the finer bottom and sides require walls of platinum resistant to the presence of glass. Although this embodiment is shown in the Figures in reference to the finer with a rectangular cross section, manufacture of the top wall using a material other than a precious metal, or only a thin layer of a precious metal is also applicable to the other cross-sectional shapes discussed herein.

Figure 11A:
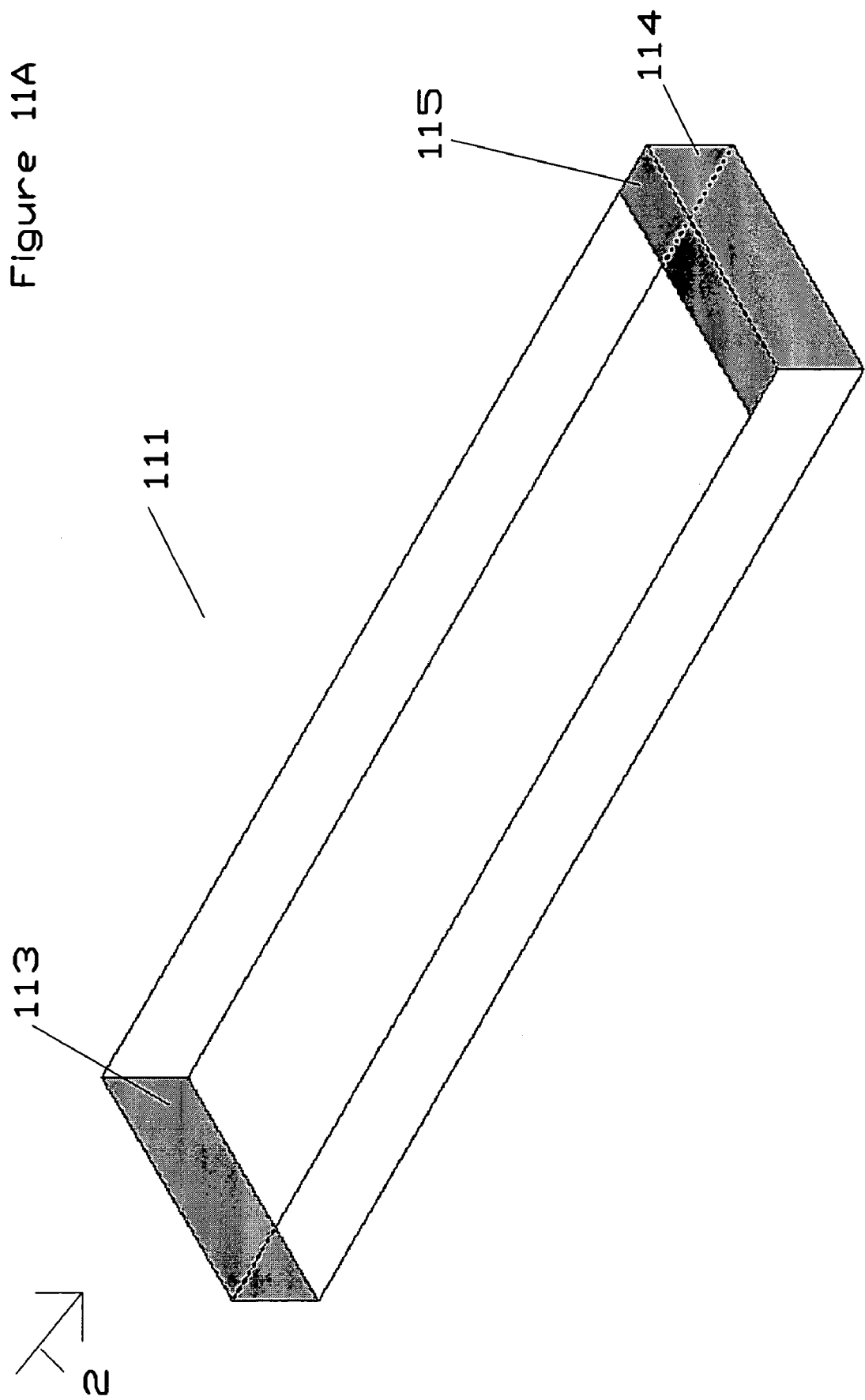
FIG. 11A shows a finer with an enlarged rectangular cross-section and a free surface in an embodiment of the present invention.

FIG. 11A shows a finer (111), which has the same length as the finers in FIGS. 1B, 2B, 4B, 5B, 6B, 10A and 10B. It has no top surface and thus has been enlarged in cross-section such that it has a wetted perimeter of 91% of the finers in FIGS. 1B, 2B, 4B, 5B, 6B, 10A and 10B. The smaller wetted perimeter allows a short vertical distance on the sides above the expected glass top surface.

Figure 11B:
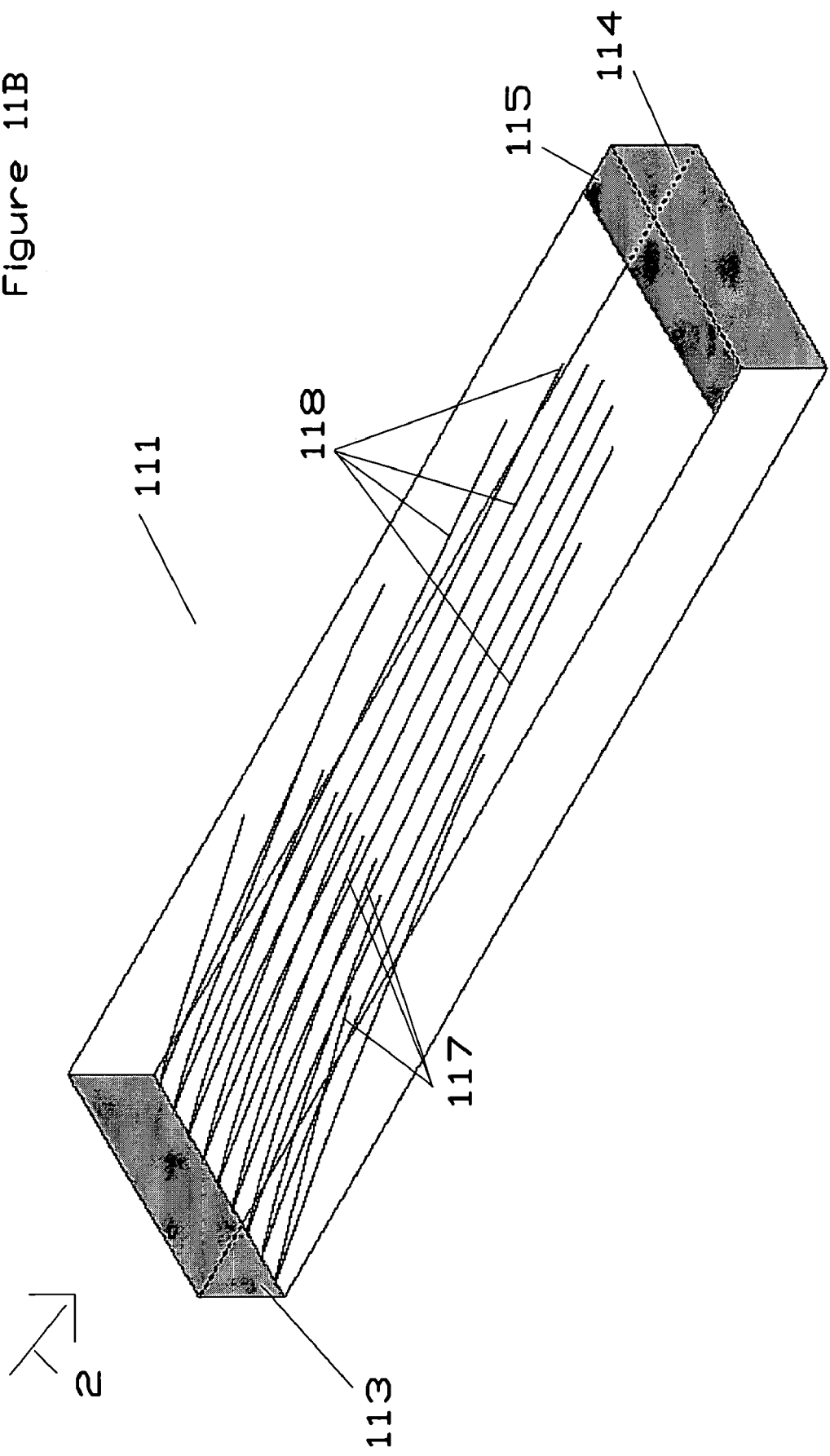
FIG. 11B shows the rising of bubbles in the finer of FIG. 11A.

FIG. 11B shows the trajectories of two sets of bubbles starting from the bottom of the inlet (113) in the finer of FIG. 11A. The first set of bubbles (117) is the same diameter as those in FIGS. 1B, 2B, 4B, 5B, 6B, 10A and 10B, whereas the second set of bubbles (118) has a diameter of 0.7 times the first set of bubbles. Both sets of bubbles rise to the top of the finer and thus dissipate to the atmosphere through a vent (115) at the outlet end (114) of the finer (111). The first set of bubbles (117) rises in approximately one half the distance of the second set of bubbles (118). This validates the diameter squared relationship for the speed of rise of a bubble. This finer has the same precious metal cost as a finer of prior art and removes bubbles which have a diameter equal to 70% of the diameter of the bubbles removed by a finer of prior art. Optionally the finer could be made shorter for lower construction cost and equal performance. This would be an economic decision based on the value of manufactured product produced from the glass with less and smaller bubbles.

Accordingly, it is to be understood that the embodiments of the invention herein described are merely illustrative of the application of the principles of the invention. Reference herein to details of the illustrated embodiments is not intended to limit the scope of the claim's, which themselves recite those features regarded as essential to the invention.

What is claimed is:

1. A finer for removing bubbles from molten glass, comprising:
   walls that contain the molten glass in the finer, wherein the walls are constructed of a precious metal;
   a glass inlet for receiving molten glass;
   an outlet to allow molten glass to exit the finer for further processing; and
   a cross-sectional shape having a width to height ratio substantially greater than 1.00, wherein the cross-sectional shape is selected from the group consisting of a) an elliptical cross-section; b) a cross-section comprising a curved top, a curved bottom parallel to the curved top, and two curved sides, wherein the curved bottom and the curved top are the same length and are longer than the curved sides, wherein each of the curved sides are the same length and connects the curved top to the curved bottom at one end; and c) a horizontally oblong cross-section comprising a curved top and a curved bottom not parallel to the curved top, connected at each end by two curved sides, wherein any of the curved top, the curved bottom or the curved sides are comprised of curved and straight sections and may be shaped to be convex outward or convex inward;
   wherein the finer is operatively connected to a vent for eventually releasing the bubbles at a top of the finer to atmosphere.

2. The finer of claim 1, wherein the width to height ratio is 1.50 or greater.

3. The finer of claim 1, wherein the width to height ratio is approximately 3.00.

4. The finer of claim 1, wherein the walls comprise a top wall, wherein a top surface of the glass in the finer does not make direct contact with the top wall of the finer over at least a portion of a length of the finer.

5. The finer in claim 4, wherein the top wall of the finer comprises a thinner section of the precious metal than the other walls of the finer.

6. The finer of claim 1, further comprising at least one baffle positioned within the finer to redistribute a flow of molten glass through the finer.

7. The finer of claim 6, wherein the baffles comprise a plurality of baffles aligned at an acute angle to a direction of glass flow through the finer.

8. The finer of claim 6, wherein the baffles comprise a plurality of plates, wherein the plates are mounted in a central portion of the glass stream.

9. The finer of claim 6, wherein the baffles comprise a matrix of rods placed in the glass stream such that the bubbles passing through the finer pass in close proximity to at least one rod in the matrix.

10. The finer of claim 9, wherein the matrix of rods comprises a plurality of rods slanted toward a top of the finer such that viscous forces of glass passing the rods drag the bubbles toward the top of the finer.

11. The finer of claim 1, wherein the walls comprise a top wall, wherein a top surface of the glass in the finer does not make direct contact with the top wall of the finer over at least a portion of a length of the finer.

12. The finer in claim 11, wherein the top wall of the finer comprises a thinner section of the precious metal than the other walls of the finer.

13. The finer of claim 1, wherein a top surface of the glass in the finer does not make direct contact with a top wall of the finer over at least a portion of a length of the finer.

14. The finer of claim 13, wherein the width to height ratio is 1.50 or greater.

15. The finer of claim 13, wherein the width to height ratio is approximately 3.00.

16. The finer of claim 13, further comprising at least one baffle positioned within the finer to redistribute a flow of molten glass through the finer.

17. The finer of claim 16, wherein the baffles comprise a plurality of baffles positioned within the finer to redistribute a flow of molten glass through the finer, wherein the plurality of baffles are aligned at an acute angle to a direction of glass flow through the finer.

18. The finer of claim 16, wherein the baffles comprise a plurality of plates, wherein the plates are mounted in a central portion of the glass stream.

19. The finer of claim 16, wherein the baffles comprise a matrix of rods placed in the glass stream such that the bubbles passing through the finer pass in close proximity to at least one rod in the matrix.

20. The finer of claim 19, wherein the matrix of rods comprises a plurality of rods slanted toward a top of the finer such that viscous forces of glass passing the rods drag the bubbles toward the top of the finer.

21. The finer in claim 13, wherein any portion of the top wall that is not in direct contact with the glass is constructed of a material other than a precious metal.

22. The finer in claim 13, wherein the top wall of the finer comprises a thinner section of the precious metal than the other walls of the finer.

23. The finer of claim 1, wherein the precious metal is selected from the group consisting of platinum; and a platinum alloy.

24. The finer of claim 1, wherein the finer is used to produce optical quality glass.

25. The finer of claim 24, wherein the finer is used to produce LCD glass.

26. The finer of claim 1, wherein the molten glass completely fills the finer such that the molten glass contacts all internal surfaces of the finer including a top wall of the finer.

27. A finer for removing bubbles from molten glass, comprising:
   walls that contain the molten glass in the finer, wherein the walls are constructed of a precious metal;
   a glass inlet for receiving molten glass;
   an outlet to allow molten glass to exit the finer for further processing; and
   a cross-sectional shape that maximizes a parameter defined as a cross-sectional area divided by a vertical distance that a plurality of bubbles must travel to a top of the finer, wherein the cross-sectional shape is selected from the group consisting of a) an elliptical cross-section; b) a cross-section comprising a curved top, a curved bottom parallel to the curved top, and two curved sides, wherein the curved bottom and the curved top are the same length and are longer than the curved sides, wherein each of the curved sides are the same length and connects the curved top to the curved bottom at one end; and c) a horizontally oblong cross-section comprising a curved top and a curved bottom not parallel to the curved top, connected at each end by two curved sides, wherein any of the curved top, the curved bottom or the curved sides are comprised of curved and straight sections and may be shaped to be convex outward or convex inward;

wherein the finer is operatively connected to a vent for eventually releasing the bubbles at a top of the finer to atmosphere.

28. The finer of claim 27, further comprising a cross-sectional shape having a width to height ratio greater than 1.00.

29. The finer of claim 27, wherein the width to height ratio is 1.50 or greater.

30. The finer of claim 27, wherein the width to height ratio is approximately 3.00.

31. The finer of claim 27, further comprising at least one baffle positioned within the finer to redistribute a flow of molten glass through the finer.

32. The finer of claim 31, wherein the baffles comprise a plurality of baffles aligned at an acute angle to a direction of glass flow through the finer.

33. The finer of claim 31, wherein the baffles comprise a plurality of plates, wherein the plates are mounted in a central portion of the glass stream.

34. The finer of claim 31, wherein the baffles comprise a matrix of rods placed in the glass stream such that the bubbles passing through the finer pass in close proximity to at least one rod in the matrix.

35. The finer of claim 34, wherein the matrix of rods comprises a plurality of rods slanted toward a top of the finer such that viscous forces of glass passing the rods drag the bubbles toward the top of the finer.

36. The finer of claim 26, wherein the finer maximizes a time that bubbles spend in the finer such that the bubbles have sufficient time to rise to the top of the finer.

37. The finer of claim 27, wherein the precious metal is selected from the group consisting of platinum; and a platinum alloy.

38. The finer of claim 27, wherein the finer is used to produce optical quality glass.

39. The finer of claim 38, wherein the finer is used to produce LCD glass.

40. The finer of claim 27, wherein the molten glass completely fills the finer such that the molten glass contacts all internal surfaces of the finer including a top wall of the finer.

41. A finer for removing bubbles from molten glass, comprising:
  walls that contain the molten glass in the finer;
  a glass inlet for receiving molten glass;
  an outlet to allow molten glass to exit the finer for further processing; and
  at least one baffle positioned within the finer to redistribute a flow of molten glass through the finer, wherein the baffle is aligned at an acute angle to a direction of glass flow through the finer;
  wherein the finer is operatively connected to a vent for eventually releasing the bubbles at a top of the finer to atmosphere.

42. The finer of claim 41, wherein the baffle comprises a plurality of baffles aligned in a direction of glass flow through the finer.

43. The finer of claim 41, wherein the baffle comprises a plurality of baffles and is located at a top of the finer near the vent at an outlet end of the finer.

44. The finer of claim 41, wherein the baffle comprises a plurality of baffles and is located at a bottom of the finer near a location where molten glass enters the finer.

45. The finer of claim 41, wherein the baffles have a surface selected from the group consisting of a curved surface and a flat surface.

46. A finer for removing bubbles from molten glass, comprising:
  walls that contain the molten glass in the finer;
  a glass inlet for receiving molten glass;
  an outlet to allow molten glass to exit the finer for further processing; and
  a plurality of plates positioned within the finer to redistribute a flow of molten glass through the finer, wherein a surface of each plate is substantially parallel to a set of streamlines of flow through the finer,
  wherein the finer is operatively connected to a vent for eventually releasing the bubbles at a top of the finer to atmosphere.

47. The finer of claim 46, wherein the plates are mounted in a central portion of the glass stream.

48. The finer of claim 46, herein the finer further comprises a rectangular cross-section including a top wall and a bottom wall.

49. The finer of claim 48, wherein the plates are substantially parallel to the top and bottom walls of the finer.

50. The finer of claim 46, wherein the plates comprise a surface selected from the group consisting of a flat surface and a curved surface.

51. The finer of claim 46, wherein edges of the plates are connected together to form a structure comprising a plurality of passages for glass flow, wherein each passage has a rectangular cross-section.

52. The finer of claim 46, wherein edges of the plates are connected together to form a structure comprising a plurality of passages for glass flow, wherein each passage has a pentagonal cross-section.

53. The finer of claim 46, wherein edges of the plates are connected together to form a structure comprising a plurality of passages for glass flow, wherein each passage has a hexagonal cross-section.

54. A finer for removing bubbles from molten glass, comprising:
  walls that contain the molten glass in the finer;
  a glass inlet for receiving molten glass;
  an outlet to allow molten glass to exit the finer for further processing; and
  a matrix of rods placed in the glass stream such that the bubbles passing through the finer pass in close proximity to at least one rod in the matrix;
  wherein the finer is operatively connected to a vent for eventually releasing the bubbles at a top of the finer to atmosphere.

55. The finer of claim 54, wherein the matrix of rods comprises a plurality of rods slanted toward a top of the finer such that viscous forces of glass passing the rods drag the bubbles toward the top of the finer.

* * * * *